United States Patent [19]

Aono et al.

[11] Patent Number: 4,639,361

[45] Date of Patent: Jan. 27, 1987

[54] PROCESS OF PREPARING DISILANE BY REDUCTION OF HEXACHLORODISILANE

[75] Inventors: Koji Aono, Saitama; Toshinori Saito, Kawagoe; Chiharu Okada, Kamifukuoka, all of Japan

[73] Assignee: Central Glass Company, Limited, Ube, Japan

[21] Appl. No.: 702,643

[22] Filed: Feb. 19, 1985

[30] Foreign Application Priority Data

Feb. 21, 1984 [JP] Japan .................................. 59-29507

[51] Int. Cl.$^4$ ............................................. C01B 33/04
[52] U.S. Cl. ..................................... 423/347; 423/344
[58] Field of Search ....................................... 423/347

[56] References Cited

U.S. PATENT DOCUMENTS 4,374,111 2/1983 Lefrancois .......................... 423/347
4,407,783 10/1983 Ulmer et al. ........................ 423/347

FOREIGN PATENT DOCUMENTS 0156522 9/1983 Japan ................................... 423/347

874237 8/1961 United Kingdom .

OTHER PUBLICATIONS

"The Preparation and Some Properties of Hydrides of Elements of the Fourth Group of the Periodic System and of their Organic Derivatives", Finholt et al, J. AM. Chem. Soc., 69, 2692 (1947).

*Primary Examiner*—John Doll
*Assistant Examiner*—Lori S. Freeman
*Attorney, Agent, or Firm*—Fleit, Jacobson, Cohn & Price

[57] ABSTRACT

Disilane $Si_2H_6$ is obtained with good yield by reduction reaction of $Si_2Cl_6$ with a mixture of LiH and $LiAlH_4$ in an organic liquid medium such as n-butyl ether. Usually the reaction temperature is $-25°$ C. to $50°$ C. A suitable range of the mole ratio of LiH to $LiAlH_4$ is from 0.8 to 40. It is impracticable to reduce $Si_2Cl_6$ to $Si_2H_6$ by using LiH alone as the reducing agent, but the reaction proceeds smoothly when a $LiH/LiAlH_4$ mixture is used. The use of the mixture is economically advantageous over the use of expensive $LiAlH_4$ alone.

12 Claims, No Drawings

PROCESS OF PREPARING DISILANE BY REDUCTION OF HEXACHLORODISILANE

BACKGROUND OF THE INVENTION

This invention relates to a process of preparing disilane by reduction reaction of hexachlorodisilane with a mixture of metal hydrides in an organic liquid medium.

Disilane $Si_2H_6$ is useful particularly as a raw material gas for producing amorphous silicon.

It is known that disilane is obtained by reduction reaction of hexachlorodisilane $Si_2Cl_6$ with lithium aluminum hydride $LiAlH_4$ in an organic liquid medium: e.g., J. Am. Chem. Soc., 69, 2692 (1947). However, this method cannot be regarded as favorable for industrial preparation of disilane because lithium aluminum hydride consumed as the reducing agent is an expensive material.

SUMMARY OF THE INVENTION

It is an object of the present invention to provide a process of preparing disilane from hexachlorodisilane with fairly good yield and at lower cost than the above described known method.

This invention provides a process of preparing disilane, which comprises the step of subjecting hexachlorodisilane to reduction reaction with a mixture of lithium hydride and lithium aluminum hydride in an organic liquid medium.

In this process a suitable range of the mole ratio of LiH to $LiAlH_4$ in the aforementioned mixture is from 0.8 to 40. A suitable organic liquid medium can be found in ethers. The reaction temperature is not critical and may range from about $-25°$ C. to about $50°$ C.

Lithium hydride is considerably cheaper than lithium aluminum hydride. Although hexachlorodisilane is hardly reduced to disilane when lithium hydride alone is used as the reducing agent, we have made a surprising discovery that when lithium aluminum hydride coexists with lithium hydride lithium hydride, actively participates in the reduction of hexachlorodisilane to disilane so that the use of a mixture of lithium hydride and lithium aluminum hydride makes it possible to obtain disilane from hexachlorodisilane with good yield and with a considerable decrease in the consumption of expensive lithium aluminum hydride. Therefore, the process according to the invention is very advantageous from an economical or industrial point of view.

An additional advantage of our process is the ease of separating the by-produced chlorides from the product. In the known method using only lithium aluminum hydride as the reducing agent, a large amount of aluminum chloride dissolves in the organic liquid medium so that the recovery of the chloride and the reuse of the liquid medium are very troublesome. In our process the formation of aluminum chloride is nominal, and the major portion of the by-produced chlorides is lithium chloride which is hardly soluble in organic solvents and, hence, can easily be filtered out.

DESCRIPTION OF THE PREFERRED EMBODIMENTS

The starting material, hexachlorodisilane, can be obtained as a high purity liquid by chlorinating either metallic silicon or a suitable metal silicide at a relatively low temperature and refining the obtained crude chloride by, for example, fractional distillation.

The organic liquid medium used in this invention is usually an ether. It is preferable to use a relatively high boiling point ether such as n-butyl ether or diethylene glycol dimethyl ether. It is convenient to dilute hexachlorodisilane with the employed ether before introducing it into the reactor, but this is not essential. The mixture of lithium hydride and lithium aluminum hydride used as the reducing agent is suspended in the employed ether before starting the reduction reaction.

As mentioned hereinbefore, it is suitable that the mole ratio of LiH to $LiAlH_4$ falls in the range from 0.8 to 40. Since 1 mole of $LiAlH_4$ is equivalent to 4 moles of LiH in respect of hydrogen atoms, the suitable range of LiH/$LiAlH_4$ ratio is from 0.2 to 10 on the basis of hydrogen atoms. If the mole ratio of LiH to $LiAlH_4$ is less than 0.8, the profit from the partial replacement of $LiAlH_4$ by cheaper LiH will be small. On the other hand, when the mole ratio is more than 40 the yield of $Si_2H_6$ based on $Si_2Cl_6$ lowers considerably because of insufficiency of the amount of $LiAlH_4$ for smooth proceeding of the intended reaction. It is preferred that the mole ratio of LiH to $LiAlH_4$ falls in the range from 2 to 20.

The mechanism of the participation of LiH coexisting with $LiAlH_4$ in the formation of $Si_2H_6$ from $Si_2Cl_6$ has not been clarified yet. Considering the fact that in the absence of $LiAlH_4$ the contact of $Si_2Cl_6$ with LiH results in the formation of little $Si_2H_6$, it is presumable that the following reactions take place in the reaction system according to the invention.

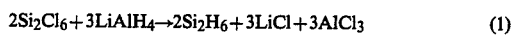

$$2Si_2Cl_6 + 3LiAlH_4 \rightarrow 2Si_2H_6 + 3LiCl + 3AlCl_3 \quad (1)$$

$$AlCl_3 + 4LiH \rightarrow LiAlH_4 + 3LiCl \quad (2)$$

That is to say, initially $LiAlH_4$ reacts with $Si_2Cl_6$ to form $Si_2H_6$ together with chlorides including a considerable amount of $AlCl_3$. Then, the by-produced $AlCl_3$ reacts with LiH to form $LiAlH_4$ within the reaction system, so that the remaining $Si_2Cl_6$ undergoes the reduction reaction of Equation (1).

For example, practical operations for performing the process according to the invention are as follows.

Initially air and moisture are practically completely discharged from the reactor by means of a vacuum pump, and an inert gas such as dry helium gas is introduced into the reactor so as to maintain an inert gas atmosphere in the entire space in the reaction apparatus. A slurry is prepared by suspending lithium hydride and lithium aluminum hydride in a selected organic liquid medium, and an appropriate quantity of the slurry is charged in the reactor. Then, hexachlorodisilane in the form of either pure liquid or solution in the aforementioned organic liquid medium is introduced into the reactor at a constant rate. Spontaneously the reduction reaction takes place, and evolution of disilane gas begins. During reaction stirring of the slurry is necessary to keep the hydrides uniformly dispersed in the liquid medium. As mentioned hereinbefore, the reaction takes place over a wide range of temperature so that there is no need of strictly controlling the reaction temperature. Usually the reaction is carried out at temperatures between about $-25°$ C. and about $50°$ C.

It is also possible to accomplish the reaction by initially charging hexachlorodisilane in the reactor and supplying thereto a suspension of the hydrides in an organic liquid medium at a constant rate, but the above described sequence is more favorable for industrial operations. As to the proportion of the mixture of lithium hydride and lithium aluminum hydride to hexachlorodisilane, it is suitable that the total quantity of the hydrides brought into the reaction system amounts to 110 to 150% of the theoretical quantity.

The gaseous reaction product is passed through a reflux condenser to remove the organic solvent and then cooled to about −130° C. by isopentane bath to thereby collect disilane, leaving a small amount of monosilane formed as a by-product in gas phase. Subsequently, monosilane is recovered by cooling with liquefied nitrogen.

The invention will further be illustrated by the following nonlimitative examples.

EXAMPLE 1

The reactor was a stainless steel autoclave which had a capacity of 500 ml and was provided with an induction stirrer. The reactor was connected to a reflux condenser cooled at −10° C. for recovery of the organic solvent and then to a cold trap cooled at −130° C. for collection of disilane. Air and moisture were almost completely discharged from the thus constructed reaction apparatus by operating a vacuum pump until the inner pressure became below 0.2 Torr (i.e. below 27 Pa). Then, dry helium gas was introduced into the apparatus until the inner pressure reached the atmospheric pressure in order to carry out the following reaction in pure helium gas atmosphere at normal pressure.

A suspension was prepared by dispersing 3.12 g (0.39 mole) of LiH (equivalent to 0.098 mole of $LiAlH_4$ in respect of hydrogen atmos) and 3.71 g (0.098 mole) of $LiAlH_4$ in n-butyl ether which had been dehumidified by molecular sieve after preliminary drying with calcium dichloride. The quantity of n-butyl ether was controlled such that the resultant suspension was 97.6 g in weight and about 7 wt% in the concentration of the solid particles. In this suspension, the mole ratio of LiH to $LiAlH_4$ was approximately 4.0 (approximately 1.0 on the basis of hydrogen atoms). The entire quantity of the suspension was pumped into the reactor.

The stirrer of the reactor was operated, and the interior of the reactor was cooled to about 5° C. by external cooling means. A solution was prepared by mixing 26.9 g (0.10 mole) of $Si_2Cl_6$ with 26.9 g of n-butyl ether. Using a metering pump, this solution was introduced into the reactor at such a flow rate that the feed of 53.8 g of the solution required 40 min. After that, stirring was continued for about 1 hr to thereby complete the reaction.

The reaction gas evolved in the reactor was entirely passed to the reflux condenser for separation of a trace quantity of solvent contained in the gas and then to the −130° C. trap for recovery of disilane. After that, a trace quantity of by-produced monosilane was recovered in a separate trap cooled at −196° C. After completion of the above described reaction in the reactor, the entire quantity of the recovered disilane was vaporized in a separate vacuum vessel. The obtained disilane gas weighed 5.58 g (0.09 mole). Therefore, the yield of disilane based on the feed of hexachlorodisilane was 90%.

EXAMPLE 2

The process of Example 1 was repeated in the same manner except that the mole ratio of LiH to $LiAlH_4$ was increased to 20 (5.0 on the basis of hydrogen atoms). That is, 5.20 g (0.65 mole) of LiH (equivalent to 0.163 mole of $LiAlH_4$) and 1.24 g (0.33 mole) of $LiAlH_4$ were dispersed in n-butyl ether to obtain 92.0 g of suspension, which was initially charged in the reactor.

In this case the quantity of the obtained disilane gas was 5.52 g (0.089 mole), meaning that the yield of disilane based on the feed of hexachlorodisilane was 89%.

EXAMPLES 3–6

In these examples, the mole ratio of LiH to $LiAlH_4$ in the process of Example 1 was differently changed as shown in the following Table. In respect of hydrogen atoms, the total quantity of the hydrides was unchanged throughout Examples 1 to 6: it was equivalent to 0.195 mole of $LiAlH_4$. Otherwise, the process of Example 1 was performed identically. The results in the respective examples are also shown in the same table.

| | LiH | $LiAlH_4$ | Mole Ratio $LiH/LiAlH_4$ (in paren., on the basis of H atoms) | Yield of $Si_2H_6$ based on $Si_2Cl_6$ |
|---|---|---|---|---|
| Ex. 3 | 1.04 g (0.13 mol) | 6.18 g (0.163 mol) | 0.8 (0.2) | 83% |
| Ex. 4 | 2.08 g (0.26 mol) | 4.94 g (0.130 mol) | 2.0 (0.5) | 88% |
| Ex. 5 | 4.68 g (0.585 mol) | 1.85 g (0.049 mol) | 12.0 (3.0) | 90% |
| Ex. 6 | 5.67 g (0.72 mol) | 0.68 g (0.018 mol) | 40.0 (10.0) | 70% |

REFERENCE 1

In place of the mixture of LiH and $LiAlH_4$ in Example 1, 7.41 g (0.195 mole) of $LiAlH_4$ alone was used. Otherwise, the process of Example 1 was performed identically. As the result, disilane was obtained with yield of 83% based on the feed of hexachlorodisilane.

REFERENCE 2

In place of $LiAlH_4$ in Reference 1, 6.24 g of LiH (0.78 mole: equivalent to 0.195 mole of $LiAlH_4$ in respect of hydrogen atoms) was used. Otherwise, the process of Example 1 was performed identically. In this case, disilane was absent in the reaction product.

What is claimed is:

1. A process of preparing disilane, comprising the step of subjecting hexachlorodisilane to a reduction reaction with a mixture of lithium hydride and lithium aluminum hydride in an organic liquid medium; wherein the molar ratio of lithium hydride to lithium aluminum hydride in said mixture is between about 2 and about 20 and wherein the total quantity of lithium hydride and lithium aluminum hydride is between about 110 percent and about 150 percent of the theoretical quantity.

2. A process according to claim 1, wherein the reaction is carried out at temperatures in the range from about −25° C. to about 50° C.

3. A process according to claim 1, wherein said liquid medium is an ether.

4. A process according to claim 3, wherein said ether is selected from the group consisting of n-butyl ether, and diethylene glycol dimethyl ether.

5. A process according to claim 1, wherein the reaction is carried out by introducing hexachlorodisilane diluted with said organic liquid medium into a suspension of said mixture in said organic liquid medium.

6. The process of claim 1 wherein the mole ratio of lithium hydride to lithium aluminum hydride in said mixture is up to and including 12.

7. The process of claim 1 which is conducted in an atmosphere substantially in the absence of air and moisture.

8. The process of claim 7 wherein the reduction reaction is conducted in an atmosphere comprising an inert gas.

9. The process of claim 5 wherein the reaction suspension is constantly stirred.

10. The process of claim 1 further comprising:
removing the organic liquid medium from the reduction reaction product in the form of a gas, and cooling said gaseous product to about and including $-130°$ C., thereby separating disilane as a liquid from the gas.

11. In a process for obtaining disilane by reducing hexachlorodisilane with lithium aluminum hydride in the presence of an organic solvent, the improvement comprising
substituting a mixture of lithium hydride and lithium aluminum hydride for lithium aluminum hydride; wherein the molar ratio of lithium hydride to lithium aluminum hydride in said mixture is between about 2 and about 20 and wherein the total quantity of lithium hydride and lithium aluminum hydride is between about 110 percent and about 150 percent of the theoretical quantity.

12. The process of claim 11 wherein the molar ratio of lithium hydride to lithium aluminum hydride in said mixture is up to and including 12.

* * * * *